United States Patent [19]

Wu

[11] Patent Number: 5,107,691

[45] Date of Patent: Apr. 28, 1992

[54] CAR LOCK

[76] Inventor: Wen-Yin Wu, 12F-3, No192, Chung Cheng 2nd Road, Kaohsiung, Taiwan

[21] Appl. No.: 677,638

[22] Filed: Mar. 28, 1991

Related U.S. Application Data

[63] Continuation of Ser. No. 459,646, Jan. 2, 1990, abandoned.

[51] Int. Cl.⁵ .............................................. B60R 25/02
[52] U.S. Cl. ..................................... 70/209; 70/226; 70/238
[58] Field of Search ................................ 70/209–211, 70/215, 238, 225, 226, 252

[56] References Cited

U.S. PATENT DOCUMENTS

| | | | |
|---|---|---|---|
| 1,519,086 | 12/1924 | Coffman | 70/238 X |
| 2,716,336 | 8/1955 | Ross | 70/238 |
| 3,690,131 | 9/1972 | Davis | 70/238 X |
| 4,887,443 | 12/1989 | Wang | 70/209 |
| 4,935,047 | 6/1990 | Wu | 70/209 |

FOREIGN PATENT DOCUMENTS

| | | | |
|---|---|---|---|
| 2924103 | 7/1980 | Fed. Rep. of Germany | 70/238 |
| 664604 | 9/1929 | France | 70/211 |
| 941212 | 11/1963 | United Kingdom | 70/238 X |

Primary Examiner—Renee S. Luebke
Assistant Examiner—Suzanne L. Dino
Attorney, Agent, or Firm—Kirschstein, Ottinger, Israel & Schiffmiller

[57] ABSTRACT

A car lock to be mounted on the steering wheel comprising a handle with a front grooved section, a tubular lock base comprising a hollow passage linked with a tube linked with a screwed rod, and a lock fixed on the lock base. A hook is fixed on the handle to be hooked on the steering wheel to keep it from turning around with help of the screwed rod. The handle has its front grooved section mounted for movement in the hollow passage and the tube of the lock base, and can be pulled down in relation to the lock base to position the hook on the steering wheel and then lock the lock, whose dead bolt then sticks in one of the grooves in the grooved section of the handle making the steering wheel impossible to turn.

3 Claims, 3 Drawing Sheets

CAR LOCK

This is a continuation of application Ser. No. 07/459,646 filed Jan. 2, 1990, and now abandoned.

BACKGROUND OF THE INVENTION

At present, several kinds of car locks are in use. One kind is removably mounted on the steering wheel and another kind is permanently fixed on the base of the steering wheel. Generally speaking, the former is preferred by most users, mainly because the former can be taken away off the steering wheel, and besides, directly forces a thief to give up his intention to steel the car. But most of the car locks mounted on the steering wheel have an extensible handle for hampering the steering wheel from being turned around, and a hook for hooking the circular body of the steering wheel. Said hook is commonly made of a tube, which is not so hard to prevent it from being illegally pried off by a thief.

SUMMARY OF THE INVENTION

This invention has an object to furnish a car lock having more strength than the conventional ones in preventing it from being broken illegally.

The car lock in accordance with the present invention is to be mounted on the steering wheel, hampering it from turning around. It comprises a straight handle having a front section with a plurality of circumferential grooves, a lock base having a lengthwise hollow passage and a tube abutting on the passage and a screwed rod abutting on the tube.

A solid hook is fixed at the outer surface of the handle to hook on the steering wheel body and keep it from turning with the help of the screwed body at the outer end of the lock base screwed around the steering wheel body.

The front grooved section of the handle inserts and moves to and fro in the hollow passage and in the tube of the lock base to as to adjust the whole length of the handle in relation to the lock base after the screwed rod and the hook have been positioned on the steering wheel, and the lock fixed on the outer surface of the lock base can be locked with a key, making the dead bolt stick in one of the grooves in the grooved section of the handle, keeping the handle immovable in the steering wheel.

DETAILED DESCRIPTION OF THE INVENTION

The car lock according to the present invention comprises a handle 1, and a lock base 2, as its main components.

Figures 1, 2:
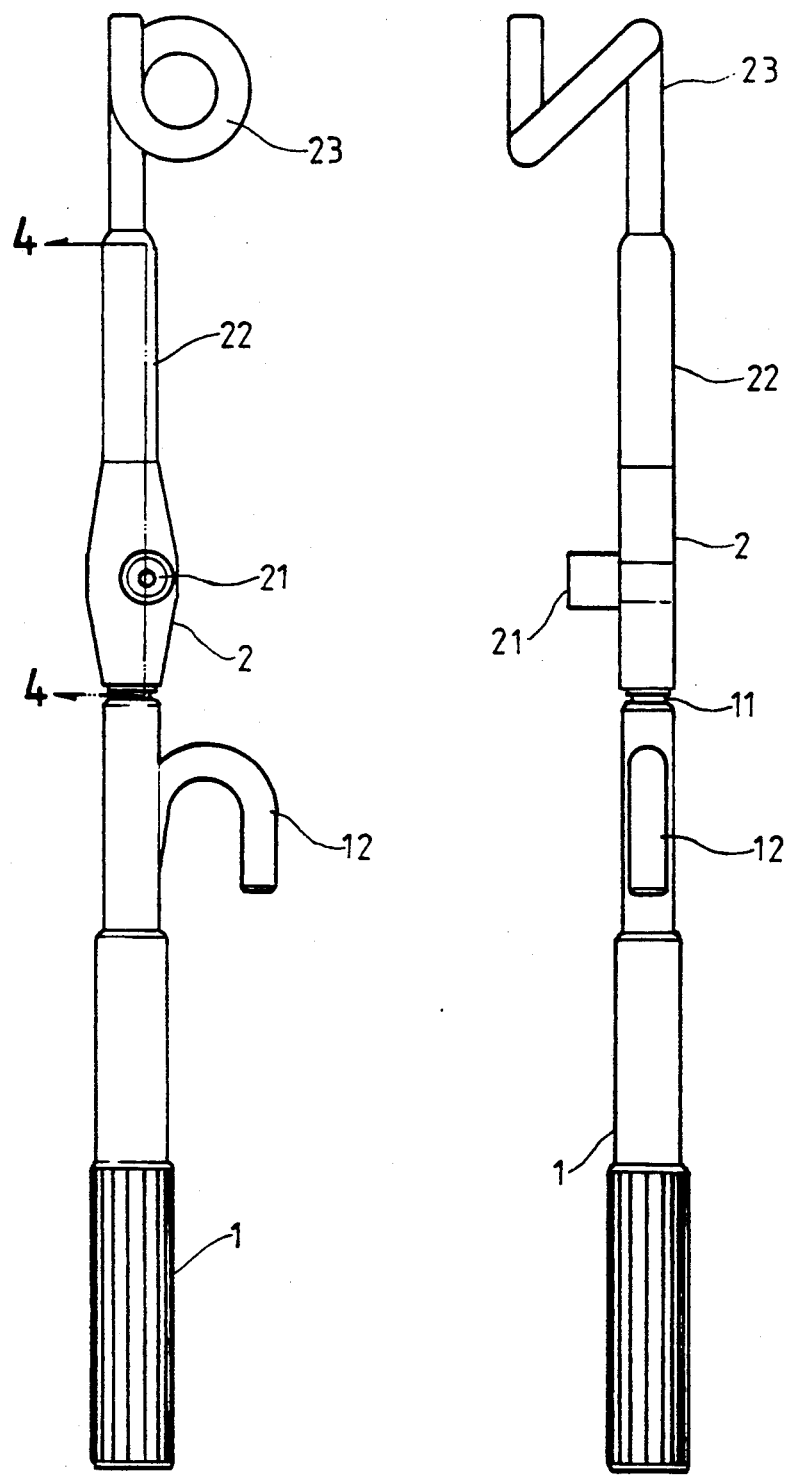
FIG. 1 is a front view of the car lock in accordance with the present invention.
FIG. 2 is a leftside view of the car lock in accordance with the present invention.
Figure 3:
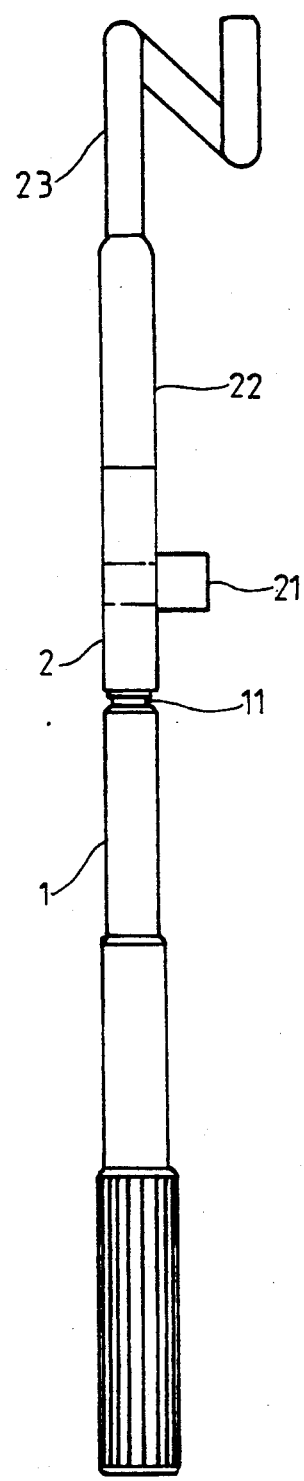
FIG. 3 is a rightside view of the car lock in accordance with the present invention.
Figure 4:
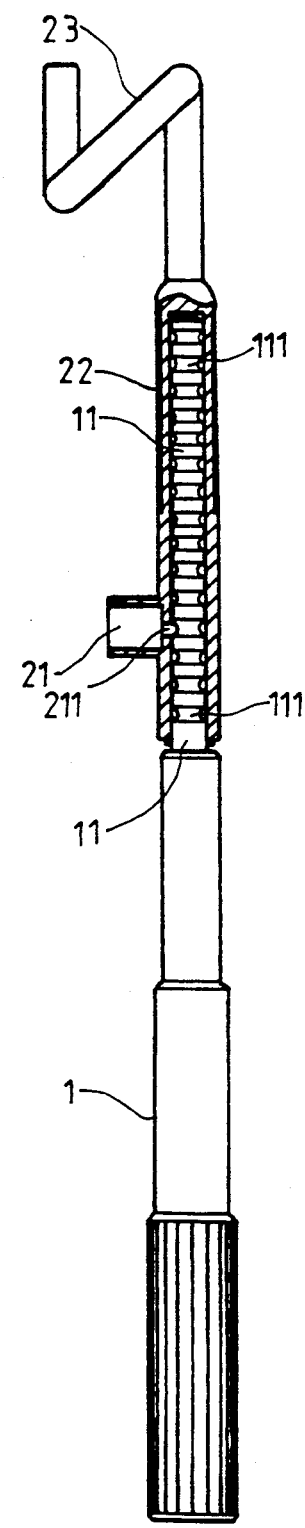
FIG. 4 is a cross-sectional view taken on line 4—4 of FIG. 1.

Referring to FIG. 1, the handle 1 has a proper length to fit on the steering wheel, provided with a grooved section 11 at the front. The grooved section 11 is provided with a plurality of circumferential grooves 111 for the dead bolt of a lock 21 to stick in one of them so as to stop the grooved section 11. The handle 1 has two sections of different diameter to reduce the weight. Besides, a hook 12 is made of a solid material and fixed on the outer surface of the handle 1 to hook on the steering wheel body keeping the handle 1 fixedly mounted on the steering wheel.

The tubular lock base 2 is provided with a lengthwise hollow passage for the grooved section 11 of the handle 1 to insert and move to and fro therein, and the lock 21 having the dead bolt 211 is fixed on the outer surface of the lock base 2 such that the dead bolt 211 can stick in any of the circumferential grooves 111 to lock this car lock on the steering wheel. Besides, the lock base 2 is provided with a tube 22 extending out from the end of the hollow passage for the grooved section 1 of the handle 1 to insert and move to and fro therein.

A screwed rod 23 having a 360°-screwed end is linked with the outer end of the tube 22 in a straight line and the screwed end has an intermediate space a bit larger than the diameter of the steering wheel body so that said screwed end can be screwed around the wheel body to mount this lock on it.

Figure 5:
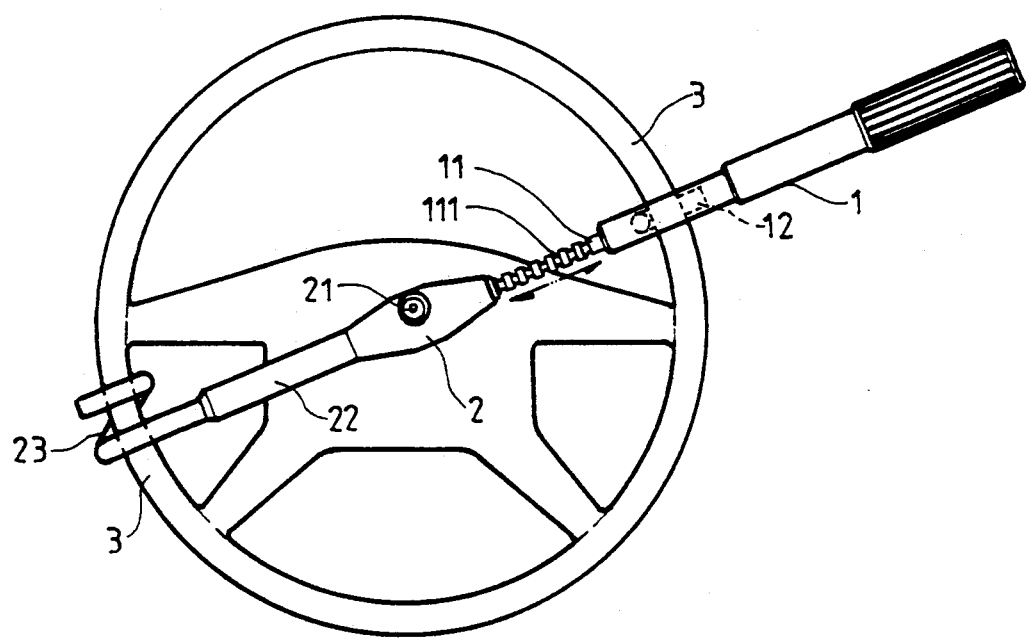
FIG. 5 is a perspective view of the car lock of this invention practically locking a steering wheel.

Now how to mount this lock on the steering wheel 3 is to be described. Referring to FIG. 5, in using this lock, at first the screwed end of the rod 23 is to be fitted on a certain spot of the steering wheel 3 by screwing. Then the handle 1 is to be pulled down in relation to the lock base 2 to make the hook 12 hook on the steering wheel body so that the wheel 3 can be caught firmly not to be turned any more with help of the screwed end of the rod 23. Now the lock 21 is to be locked with the key, making the dead bolt 211 stick in one of the circumferential grooves 111, and the locking action of this car lock on the steering wheel 3 is finished.

This lock is deemed to have the following advantages.

1. The screwed end of the screwed rod 23 can effectively prevent the lock from being broken, giving practical safety guarantee.

2. The hook 12 is made of a solid material, not hollow, having strength enough to resist illegal destruction. Even if it should be broken, the other end, the screwed end of the rod 23 would still remain on the steering wheel, impossible to be wrenched straight, keeping the lock on the steering wheel.

I claim:

1. A car lock for attachment to a steering wheel of a car, comprising:

(a) an elongated handle extending along a longitudinal axis and including an inner grooved rod-shaped end having a plurality of circumferential grooves, an outer rod-shaped end, and an intermediate rod-shaped portion between the handle ends and having a generally U-shaped hook portion extending from the intermediate portion, said U-shaped hook portion having an open end that faces the outer rod-shaped end of the handle and that engages the wheel from the inside thereof at a selected location on the wheel, said outer rod-shaped end extending a substantial distance beyond the periphery of the wheel;

(b) a longitudinally-extending locking member having an internal passage in which the inner grooved end of the handle is mounted for longitudinal movement, said locking member having a lock housing;

(c) a lock mounted in the lock housing and having a bolt movable between open and locked positions in which the bolt is disengaged and lockingly engaged, respectively, with a selected one of said grooves; and (d) a screw-shaped rod having a longitudinally-extending inner rod end fixedly secured to the locking member, a longitudinally-extending outer rod end parallel to and aligned with the inner rod end, and a coiled portion intermediate the outer rod end and the inner rod end, said coiled portion being spirally wound a complete 360° circular arc about a screw axis generally perpendicular to the longitudinal axis and also continuously extending along the screw axis, said coiled portion being mounted on and completely encircling the wheel at a predetermined location diametrically opposite said selected location.

2. The car lock according to claim 1, wherein the outer rod-shaped end of the handle has a predetermined diameter, wherein the intermediate rod-shaped portion of the handle has a diameter less than said predetermined diameter, and wherein the inner rod-shaped end of the handle has a diameter less than said diameter of the intermediate portion of the rod.

3. The car lock according to claim 1, wherein the hook is constituted of a solid material.

* * * * *